United States Patent Office 2,714,111
Patented July 26, 1955

2,714,111

PREPARATION OF THIENYL AMIDO-1,3-PROPANEDIOLS

Edward C. Hermann, Wilmington, Del., assignor to E. I. du Pont de Nemours and Company, Wilmington, Del., a corporation of Delaware No Drawing. Application August 23, 1951, Serial No. 243,361

5 Claims. (Cl. 260—332.2)

This invention relates to the preparation of thienyl amido-1,3-propanediols.

This application is a continuation-in-part of my co-pending application Serial No. 172,393, filed July 6, 1950, now abandoned.

The thienyl amido-1,3-propanediols prepared by the processes of the invention are represented by the formula

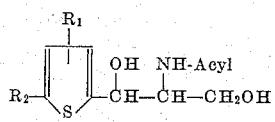

where $R_1$ represents hydrogen or a lower alkyl radical $R_2$ is hydrogen, halogen, nitro, or a lower alkyl radical and acyl represents a radical such as saturated lower aliphatic acyl, halogen substituted lower aliphatic acyl, ether substituted lower aliphatic acyl, hydroxy substituted lower aliphatic acyl, substituted and unsubstituted alicyclic acyl, heterocyclic acyl and aromatic acyl. The term "lower alkyl" as used herein includes all alkyl radicals containing not more than 6 carbon atoms.

Illustrative of thienyl amido-1,3-propanediols prepared by the processes of the invention are:

1-(5-nitro-2-thienyl)-2-dichloroacetamido - 1,3 - propanediol
1-(5-bromo-2-thienyl)-2 - dichloroacetamido-1,3-propanediol
1-(5-chloro-2-thienyl)-2-dichloroacetamido - 1,3-propanediol
1-(2-thienyl)-2-dichloroacetamido-1,3-propanediol
1-(5-methyl-2-thienyl)-2-dichloroacetamido - 1,3-propanediol
1-(5-ethyl-2-thienyl)-2-dichloroacetamido - 1,3 - propanediol
1-(5-hexyl-2-thienyl)-2-dichloroacetamido - 1,3 - propanediol
1-(3-methyl-5-nitro-2-thienyl)-2-dichloroacetamido - 1,3-propanediol
1-(5-nitro-2-thienyl)-2-acetamido-1,3-propanediol
1-(3-methyl-5-nitro-2-thienyl)-2-acetamido - 1,3-propanediol
1-(5-methyl-2-thienyl)-2-thenamido-1,3-propanediol
1-(3-methyl-5-nitro-2-thienyl) - 2 - alpha - chloropropionamido-1,3-propanediol
1-(5-nitro-2-thienyl)-2-benzamido-1,3-propanediol
1-(3-methyl-5-nitro-2-thienyl)-2-isobutyramido - 1,3-propanediol
1-(5-nitro-2-thienyl)- 2 -(2,4-dichlorophenoxyacetamido)- 1,3-propanediol
1-(5-nitro-2-thienyl)-2-cyclohexanecarboxamido - 1,3-propanediol
1-(5-nitro-2-thienyl) - 2 - (4 - methylcyclohexanecarboxamido)-1,3-propanediol
1-(5-nitro-2-thienyl)-2-trifluoroacetamido - 1,3 - propanediol
1-(5-nitro-2-thienyl)-2-lactamido-1,3-propanediol The compounds of the invention are prepared from previously known organic compounds by novel syntheses which I have discovered. These processes involve the preparation of a number of intermediate organic compounds, the existence of which has not heretofore been known.

Certain of these new intermediate compounds and all of the compounds represented by the above formula may exist in optical isomeric forms. The stereoisomeric forms as used herein refer to the spatial arrangement of the polar groups on the two asymmetric carbon atoms with reference to erythrose and threose. To differentiate between these two possible forms I will subsequently refer to the pair of stereoisomers related to erythrose in configuration as the A series or form and the pair of stereoisomers related to threose as the B series or form.

Both the A and the B forms exist as racemates of optically active dextro ($d$) and levo ($l$) rotatory isomers as well as in the form of the individual or separated dextro ($d$) and levo ($l$) optical isomers.

In view of the difficulty of representing the various optical isomers with plane formulas, I have used the customary structural formulas and adopted the following convention in order to designate their optical configuration. Where the formula represents a specific optical configuration(s) I will use an appropriate notation under the formula, for example ($l$)–B form, ($d$)–A form, ($dl$)–B form and the like.

It will be understood that where no notation appears with a structural formula or with a chemical name the formula or name is to be interpreted in its generic sense; that is, as representing the ($l$)–B, ($d$)–B, ($l$)–A, or ($d$)-A isomers in separated form as well as the ($dl$)–B or the ($dl$)–A optical racemates or a mixture of the unresolved diastereoisomers. In other words, a formula or name represents not only the unresolved mixture of isomers, but also the individual isomers and racemates.

Using the above conventions, one of the methods provided for the production of the thienyl amido-1,3-propanediols in accordance with my invention can be diagrammatically represented as follows:

Step 1

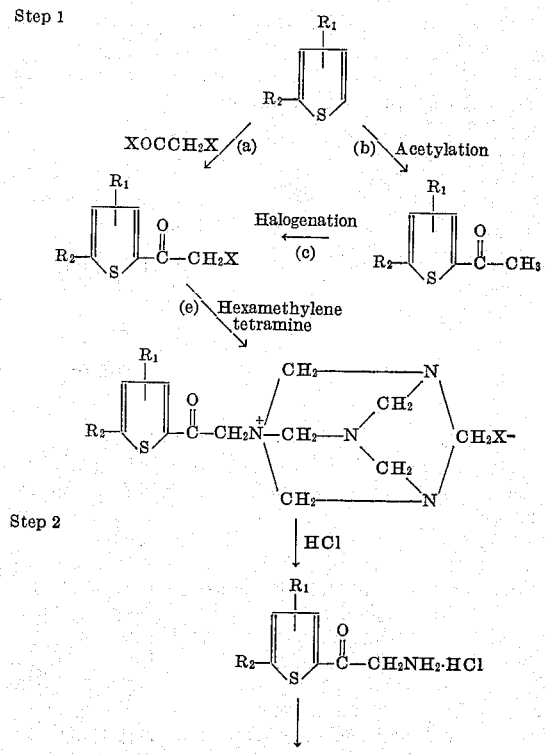

Step 2

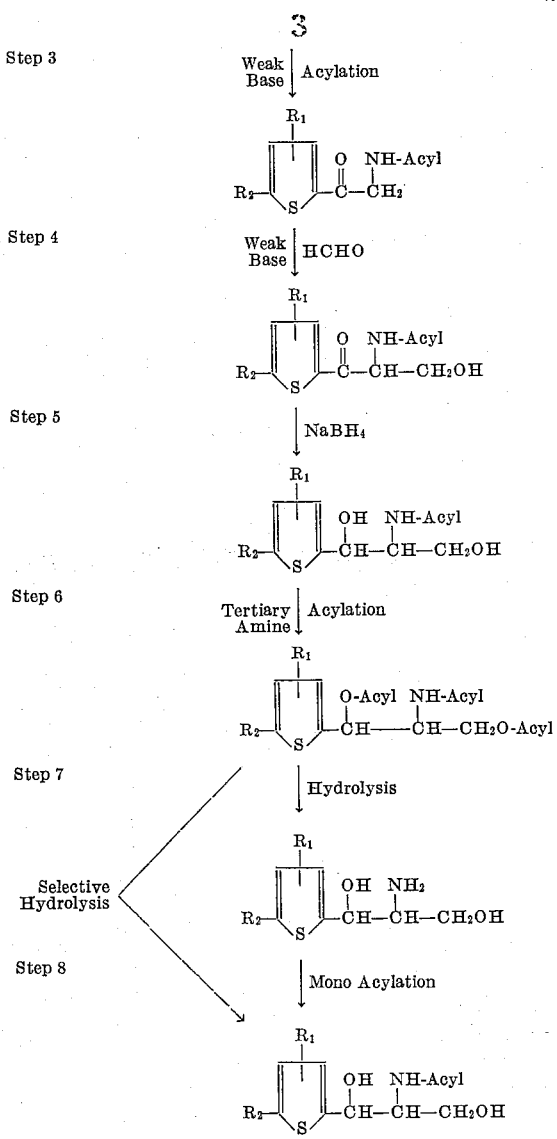

where $R_1$ and $R_2$ have the same significance as given above and X represents a chloro or bromo radical.

Step 1 of my general process involves converting a thiophene compound of the formula

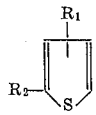

to a hexamethylenetetraminium halide of formula

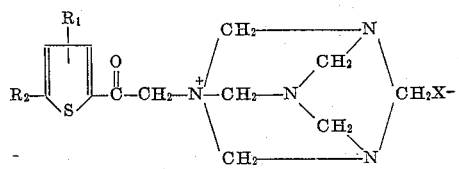

This can be accomplished in several different ways as will be apparent by reference to Step 1 of the above diagram.

The choice of one of the above methods depends upon a number of factors but primarily upon the nature of substituents on the thiophene nucleus. The shorter procedure involving sub-steps (a) and (e) is particularly preferred where $R_1$ and/or $R_2$ are alkyl. In sub-step (a) the preferred acetylating agent is bromoacetyl bromide.

The next step of the process, Step 2, comprises hydrolyzing the quaternary ammonium salt produced in Step 1 with a mineral acid such as, for instance, hydrochloric, phosphoric or sulfuric acid. The acid salt of an amine, for example,

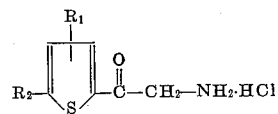

is obtained. It is preferred to carry out the hydrolysis in the presence of an alcohol.

Step 3 comprises N-acylating the (2-thenoylmethyl)-amine hydrochloride compound obtained in Step 2. This is preferably accomplished by use of acetic anhydride in the presence of a weak base, such as, for instance, sodium acetate, at temperatures below 10° C. In those instances where $R_1$ and $R_2$ are hydrogen, it has been found particularly advantageous to employ dichloroacetyl chloride or similar acid halides in place of acetic anhydride.

The fourth step in the process involves an aldol type of condensation, whereby the amide derivative produced in Step 3 is converted to compounds of formula

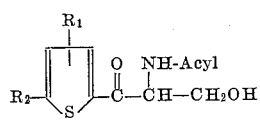

This is preferably carried out in a dilute alkaline medium such as, for instance, an aqueous sodium bicarbonate solution, using an aqueous formaldehyde solution of 36–38% concentration.

Step 5, the next step of my process, involves a reduction of the carbonyl group of the compound produced in Step 4 to a hydroxyl group. This reduction can be carried out in excellent yields using sodium borohydride in comparatively short periods of time, say, for instance, one half hour. It is preferred to use an alcoholic medium in order to solubilize the reactants. For optimum results the temperature of the reaction mixture should be maintained at from about 20 to 25° C.

If desired, the two diastereoisomeric pairs, forms A and B, can be separated at this stage. Separation can usually be effected quite completely by utilizing the difference in solubility of the two forms in organic solvents, such as, for instance, ethyl acetate or dioxane. However, in some instances, the solvent solubility differential of the two forms is not great enough to afford a clean-cut separation of the two structural isomers. In such situations it is preferable to acylate the product of Step 5 in accordance with Step 6.

Step 6 of my general process involves converting the 1-(2-thienyl)-2-amido-1,3-propanediol type compound produced in Step 5 to the completely acylated amino diol. The conversion can be carried out in two different ways. Mono-acylation followed by complete acylation may be employed. Alternatively, diacylation may be carried out in one step. I prefer to carry out the complete acylation of the thienyl amino diol in a single step rather than in two steps.

The complete acylation of the product obtained in Step 5 can be accomplished by treatment of the thienyl amido diol compound with an acylating agent, preferably acetic anhydride, in the presence of an inorganic or tertiary organic base under substantially anhydrous conditions. In general, this transformation can be effected by heating the reaction mixture at a temperature of from about 60° to 120° C. for a period from, say, about 15 minutes to several hours.

Any of a wide variety of tertiary bases may be used with the acylating agent. There may be used, for instance, pyridine, quinoline, dimethylaniline, triethylamine, N-ethylpiperidine and the like.

Where one particular diastereoisomeric pair of the product is sought, separation of the A and B forms can be effected at this point. The two diastereoisomeric pairs of the triacetyl derivative differ in their solubility in alcohol. A separation of the two diastereoisomeric pairs can, for instance, be carried out by repeated crystallizations from ethanol.

It is preferred to separate these diastereoisomeric pairs by hydrolyzing the mixture of the triacetyl derivatives to the corresponding O,N-diacetyl derivatives. The O,N-diacetyl derivatives can in turn be readily separated on the basis of their widely different solubility characteristics in water. In hydrolyzing off one of the O-acetyl groups from the completely acetylated 1-thienyl-2-amino-1,3-propanediol compound, boiling water alone is employed. It is not necessary to add either an acidic or a basic agent or a catalyst.

When a nitro group is desired on the 5-position of the thienyl radical in the final product (assuming $R_2$ is hydrogen at this point) it is preferred to add a nitration step to the general process graphically shown above. Nitration of the completely acetylated 1-(2-thienyl)-2-amino-1,3-propanediol compound of Step 6 is preferably carried out using fuming nitric acid and acetic anhydride. In all instances the temperature of the reaction mixture should be kept between —20 and +10° C. A preferred temperature is about —5° C.

The next step of my general process, Step 7, is to hydrolyze off all the acyl groups in the completely acylated 1-(2-thienyl)-2-amino-1,3-propanediol. Acidic or alkaline conditions can be used to accomplish this hydrolysis. Dilute acid is preferred. It brings about the complete hydrolysis in a short time. The acid is neutralized with caustic prior to extraction.

In carrying out Step 8 the amino diol is treated with an acylating agent under mild acylating conditions. In order to eliminate the possibility of polyacylation, I prefer to use (1) an acyl anhydride or halide under substantially anhydrous conditions at low temperature, (2) an acyl anhydride or halide in a mildly alkaline aqueous reaction medium or (3) an ester type acylating agent or halide under substantially anhydrous conditions.

When an acyl anhydride or halide is used under substantially anhydrous conditions for the acylation in Step 8, the temperature should be kept below about 10° C. A temperature of about 0° C. is preferred. It is particularly preferred to carry out the reaction in an inert organic solvent, such as for instance, esters of lower fatty acids, for example, ethyl acetate; lower aliphatic ketones, for example, acetone or methyl ethyl ketone; cyclic ether, for example, dioxane; hydrocarbons, for example, benzene; and, halogenated aliphatic hydrocarbons, for example, ethylene dichloride and chloroform.

The acylation can also be effected using an acyl halide or anhydride as the acylating agent in an aqueous medium. The reaction is preferably carried out at a temperature below the boiling point of the mixture. The pH of the aqueous medium is maintained at a value greater than 7.

Any of a wide variety of materials may be used to maintain the mixture at the proper pH. There may be used, for instance, alkali metal acetates, bicarbonates, carbonates and hydroxides; alkaline earth hydroxides; and tertiary amines, for example, pyridine, triethylamine and the like.

The aqueous reaction medium may contain a water-miscible or water-immiscible organic solvent. Usually water alone is satisfactory. If the amino diol is water-insoluble, it is advantageous to increase its solubility by adding a water-miscible organic solvent such as, for instance, methanol, ethanol or acetone.

In those instances where the acylating agent is quite reactive, it is preferred to use a two-phase system in order to reduce the exposure of the final product to unreacted acylating agent. This is effected by using as the reaction medium a mixture of water and a water immiscible organic solvent such as, for instance, ethyl acetate, chloroform, ether, carbon tetrachloride, and the like.

When an ester is used as the acylating agent in Step 8 the optimum reaction conditions are dependent upon (1) the reactivity of the ester itself and (2) the reactivity of any potentially active substituents of the ester. For esters of a given acid the lower alipahtic alkyl esters are more reactive than higher aliphatic alkyl esters. They are preferred. Of the lower alkyl types, the methyl esters are preferred.

Using very reactive esters such as, for instance, methyl dichloroacetate, and maintaining the temperature in the range of from 50° to 100° C., the acylation reaction is substantially complete in periods of from one-half to three hours.

Relatively inert esters, such as, for instance, methyl benzoate, do not react with the amino diol obtained in Step 7 within a reasonable period of time. A catalyst such as, for instance, an alkali alcoholate is added to accelerate the acylation.

When methyl dibromoacetate is used at a temperature of about 100° C., it reacts with the amino diol of Step 7 to form cyclic amide-ethers. The cyclic amide-ethers are undesirable products. To avoid the undesirable side reaction a lower reaction temperature, say, 40 to 60° C. is recommended. The use of an inert diluent such as, for instance, ethyl alcohol is also helpful.

Of the several different procedures described above for carrying out the mono N-acylation of the amino diol, one method or procedure may be preferable for a given situation. Similarly, with a given procedure the optimal conditions or reagents used may vary somewhat depending on the particular reactants.

For instance, when the final product desired has at least one alpha-halogen on the acyl group the choice of a method of acylation is to some extent dependent upon the reactivity of the halogen atom(s). Thus, in the case of the mono-, di- and tri-chloro-acetyl radicals, the halogens are relatively inert and the thienyl acylamido diol compounds of the invention can be prepared by any of the methods described above.

However, with more reactive halogen atoms, such as, for instance, alpha-bromo and alpha-iodo acyl radicals, the preferred method of preparing the corresponding acylamido diol compounds is to react the amino diol with the haloacyl halide in a substantially anhydrous, inert organic solvent such as, for instance, ethyl acetate.

In some instances, particularly if $R_2$ is halogen and $R_1$ is hydrogen, it is advantageous to eliminate Step 8 by employing a dihaloacetyl halide as the acylating agent in Step 3 of my process.

Step 8 may also be eliminated by a selective hydrolysis of the O-acyl groups present in the polyacylated amino diol compound obtained from Step 6. The hydrolysis is effected by treating the polyacylated amino diol at a temperature of from —15 to +50° C. with a strongly alkaline material using as the reaction medium a mixture consisting of water and a water-miscible organic solvent.

Any of a wide variety of alkaline materials may be used in treating the polyacylated amino diol. There may be used, for instance, alkali metal hydroxides, alkaline earth metal hydroxides and alkali metal carbonates.

Water-miscible organic solvents suitable for use in the selective hydrolysis of the O-acyl groups include lower aliphatic alcohols such as, for example, methanol, ethanol and isopropanol; lower aliphatic ketones such as, for example, acetone and methyl ethyl ketone; and cyclic ethers such as, for example, dioxane.

The preferred method of effecting the selective hydrolysis is to maintain the temperature at about 0° C. and to use only a slight excess of alkali over the amount necessary to bring about hydrolysis of the O-acyl group or groups. The solvent of choice for carrying out the reaction in this fashion is about a 50% aqueous solution of a lower aliphatic alcohol such as, for instance, methanol, or a lower aliphatic ketone such as, for instance, acetone.

Although the individual A or B stereoisomeric forms of the 1-(2-thienyl-2-amido-1,3-propanediol compound can be resolved into their optical isomers earlier in the process, I prefer to carry out the resolution following the completion of Step 7. This resolution may be carried out by forming an acid addition salt of the racemic amine of either form A or B with an optically active acid such as, for instance, (d)-camphor sulfonic acid, (l)-camphor sulfonic acid, (d)-tartaric, (l)-tartaric, (d)-mandelic and (l)-mandelic; separating the two diastereoisomeric products by recrystallization from a solvent such as, for instance, a lower aliphatic alcohol or mixtures of the same with water or other organic solvents; and then regenerating the individual optically active isomers from the separated diastereoisomeric addition salts by treating each one separately with caustic.

When carrying out the resolution, as set forth above, it is desirable but not essential to choose the form of the optically active acid so that the diastereoisomer of which the desired optical isomer is a part will separate from the crystallization solution first.

The compounds of the present invention are useful in the preparation of other organic compounds and find particular use as bacteriostatic agents. Some of the products of this invention have given evidence of great value as bactericides.

The invention is further illustrated by the following examples:

Example 1

Preparation of (dl)-B-1-(5-nitro-2-thienyl)-2-dichloroacetamido-1,3-propanediol.

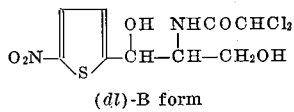

(dl)-B form

N - (2 - thenoylmethyl)hexamethylenetetraminium bromide, prepared from 2-acetylthiophene by bromination followed by addition of the resulting bromo compound in chloroform to hexamethylenetetramine, is hydrolyzed to (2-thenoylmethyl)amine hydrochloride as follows:

A mixture consisting of 984 g. of N-(2-thenoylmethyl)-hexamethylenetetraminium bromide, 1,190 ml. of concentrated hydrochloric acid and 2 liters of 95 per cent ethanol is heated at a temperature of about 50° C. for a period of about one and a half hours. The mixture is then cooled and the ammonium halides, which separated during the reaction period, are filtered off. The filtrate is concentrated by distillation under reduced pressure. The crystalline solid, which separates from the concentrated filtrate, is collected, washed with ethanol and with ether, and finally dried in vacuo.

The product obtained in the above manner is (2-thenoylmethyl)amine hydrochloride. It can be represented by the following formula:

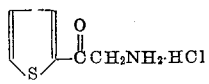

1020 g. of acetic anhydride is added to a solution of 887 g. of N-(2-thenoylmethyl)amine hydrochloride in 2.5 liters of water, cooled to a temperature of slightly above 0° C. To the resulting mixture there is added a solution of 1,358 g. of sodium acetate trihydrate in 2.5 liters of water over a period of about ten minutes while the temperature of mixture is maintained below about 10° C. After the temperature of the reaction mixture is allowed to rise to about 20° C. the mixture is acidified with hydrochloric acid. The solid which separates is collected, washed, and dried in vacuo.

The dried product consists of N-(2-thenoylmethyl)-acetamide. It is purified by recrystallization from 25 per cent aqueous ethanol. M. P. 121–122° C. The formula of the compound is:

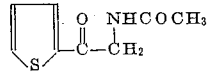

Analysis calculated for $C_8H_9NO_2S$: C, 52.44; H, 4.95; N, 7.65. Found: C, 52.48; H, 5.07; N, 7.81.

2.75 g. of sodium bicarbonate is added to a mixture composed of 550 g. of N-(2-thenoylmethyl)acetamide, 1100 ml. of water, and 452 ml. of 37 per cent aqueous formaldehyde. The temperature of the reaction mixture is maintained at about 35° C. and the reaction is continued until a clear solution results. This usually requires about 50 minutes. The reaction mixture is then stirred for a period of about three hours at room temperature. Finally it is cooled. An insoluble product is collected, washed with water, dried, and recrystallized from ethyl acetate. The purified product melts at 108–110° C. It is (dl) - N - [2 - hydroxy-1-(2-thenoyl)ethyl] acetamide, and has the formula

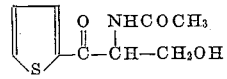

Analysis calculated for $C_9H_{11}NO_3S$: C, 50.69, H, 5.20; S, 15.03. Found: C, 50.70; H, 5.23; S, 14.70.

A solution of 3.8 g. of 95 per cent sodium borohydride in 75 ml. of methanol is added over a period of about twenty minutes to a methanolic solution of 75 g. of (dl)-N-[2-hydroxy-1-(2-thenoyl)ethyl]acetamide maintained at a temperature of from 20 to 25° C. throughout the entire addition. The reaction mixture is then stirred for a period of about fifteen minutes. The methanol is distilled from the reaction mixture under reduced pressure. The residue is mixed with 200 ml. of water, and warmed on a steam bath for a period of about thirty minutes. The aqueous solution is saturated with sodium chloride, and extracted with ethyl acetate. The extract is dried and the ethyl acetate is evaporated to obtain an isomeric mixture consisting of 1-(2-thienyl)-2-acetamido-1,3-propanediol (M. P. 111–118° C.) having the formula

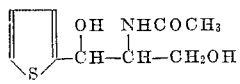

In order to separate the diastereoisomeric pairs hereinabove referred to as the A and B forms, 71 g. of a mixture consisting of (dl)-A- and (dl)-B-1-(2-thienyl)-2-acetamido-1,3-propanediols, 142 ml. of acetic anhydride, and 142 ml. of pyridine is heated in a steam bath for a period of about one-half hour. The reacted mixture is evaporated under reduced pressure. The residue is a mixture consisting of the triacetyl derivatives of both forms; that is, A and B, of 1-(2-thienyl)-2-amino-1,3-propanediol. By successive crystallization of the residue from absolute ethanol pure (dl)-A-1-(2-thienyl)-2-acetamido-1,3-propanediol diacetate (M. P. 113–114° C.) is obtained.

A variation of this procedure, which I find more efficient, is to hydrolyze the mixed isomeric triacetyl derivatives to the N,O-diacetyl derivatives. A mixture consisting of the 1-(2-thienyl)-2-acetamido-1,3-propanediol diacetate (49.2 g.) is dissolved in 900 ml. of boiling water. After the volume of the solution is reduced to about 325 ml. by boiling at atmospheric pressure in an open vessel, the solution is chilled in an ice bath. The resulting insoluble product is collected and purified by recrystallization from water; M. P. 142–143° C. The product obtained in this manner is the N,O-diacetyl derivative (dl)-B-1-(2-thienyl)-2-amino-1,3-propanediol.

Analysis calculated for $C_{11}H_{15}NO_4S$: C, 51.34; H, 5.88; N, 5.44. Found: C, 51.25; H, 5.89; N, 5.40.

The mother liquors from the separation of the B diacetyl compound described above are evaporated to dryness under reduced pressure. The gummy residue is acetylated with a mixture consisting of acetic anhydride and pyridine. The product thus obtained is purified by recrystallization from absolute ethanol; M. P. 113–114° C. The product is principally (dl)-A-1-(2-thienyl)-2-acetamido-1,3-propanediol diacetate.

Analysis calculated for $C_{13}H_{17}NO_5S$: C, 52.16; H, 5.73; N, 4.68; S, 10.71. Found: C, 52.45; H, 5.79; N, 4.74; S, 10.70.

Using an acetylation procedure identical with one just described, the triacetyl derivative of (dl)-B-1-(2-thienyl)-2-amino-1,3-propanediol, is prepared from the N,O-diacetyl derivative of the B form (M. P. about 142° C.). This product, which melts at 72–73° C. (after recrystallization from isooctane), has the formula

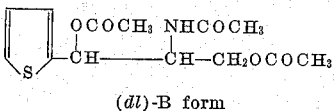

(dl)-B form

Analysis calculated for $C_{13}H_{17}NO_5S$: C, 52.16; H, 5.73; N, 4.68. Found: C, 52.08; H, 5.80; N, 4.67.

A mixture consisting of 1 g. of the N,O-diacetyl derivative of (dl)-B-1-(2-thienyl)-2-amino-1,3-propanediol, 50 ml. of 0.1N sodium hydroxide and 50 ml. of acetone is stirred over a period of about one hour while the temperature is maintained at about 0° C. The reaction mixture is neutralized with hydrochloric acid and the acetone removed by distillation under reduced pressure. The solution is extracted with ethyl acetate and the extracts are dried and concentrated to dryness under reduced pressure. The residue which is (dl)-B-1-(2-thienyl)-2-acetamido-1,3-propanediol, is purified by recrystallization from ethyl acetate; M. P. 142.5–143.5° C. The formula for this product is

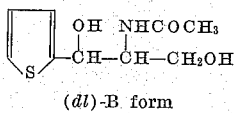

(dl)-B form

Analysis calculated for $C_9H_{13}NO_3S$: C, 50.21; H, 6.09; N, 6.51. Found: C, 50.36; H, 6.29; N, 6.51.

In like manner, (dl)-A-1-(2-thienyl)-2-acetamido-1,3-propanediol is prepared from the triacetyl derivative of (dl)-A-1-(2-thienyl)-2-amino-1,3-propanediol. This A diastereoisomeric form of 1-(2-thienyl)-2-acetamido-1,3-propanediol has a melting point of 144.5–145.0° C. Mixtures of this product with the B-N,O-diacetyl derivative and also with (dl)-B-1-(2-thienyl)-2-acetamido-1,3-propanediol give depressed melting points.

4.3 g. of fuming nitric acid (density=1.5) is added over a period of about 33 minutes to a previously cooled, stirred mixture consisting of 13.0 g. of (dl)-A-1-(2-thienyl)-2-acetamido-1,3-propanediol diacetate. During the addition the temperature of the reaction mixture is maintained between 0 and —5° C.

After a period of about one half-hour the reaction mixture is poured onto 100 g. of ice and neutralized with sodium bicarbonate. The resulting mixture is extracted with several portions of ethyl acetate. The extracts are dried with anhydrous magnesium sulfate. The ethyl acetate is distilled from the combined extracts under reduced pressure. The residual (dl)-A-1-(5-nitro-2-thienyl)-2-acetamido-1,3-propanediol diacetate is purified by recrystallization from water. The purified product melts at 139–141° C. and has the formula

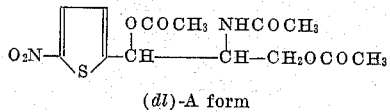

(dl)-A form

Analysis calculated for $C_{13}H_{16}N_2O_7S$: C, 45.34; H, 4.68; N, 8.14; S, 9.31. Found: C, 45.30; H, 4.66; N, 8.06; S, 9.25.

The corresponding (dl)-B form is prepared in an identical manner. When purified by recrystallization from water this compound had a M. P. of 119–120° C. Analysis calculated for $C_{13}H_{16}N_2O_7S$: C, 45.34; H, 4.68; N, 8.14; S, 9.31. Found: C, 45.45; H, 4.77; N, 7.94.

Without purification, the residue consisting of (dl)-B-1-(5-nitro-2-thienyl)-2-acetamido-1,3-propanediol diacetate obtained from the nitration of 24.0 g. of (dl)-B-1-(2-thienyl)-2-acetamido-1,3-propanediol diacetate is heated on a steam bath in the presence of 320 ml. of 1.5N hydrochloric acid for a period of from two to three hours. The reaction mixture is decolorized and the aqueous solution is concentrated under reduced pressure. The resulting concentrate is cooled and made alkaline to pH 9–10 with 6N sodium hydroxide solution. The product which separates is collected, washed and dried. Recrystallization from water yields the desired (dl)-B-1-(5-nitro-2-thienyl)-2-amino-1,3-propanediol (M. P. 123–127° C. partially purified) of formula,

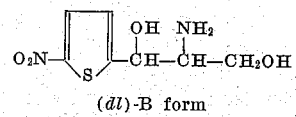

(dl)-B form

By substituting (dl)-A-1-(5-nitro-2-thienyl)-2-acetamido-1,3-propanediol diacetate for the (dl)-B-diastereoisomer used in the above procedure one obtains (dl)-A-1-(5-nitro-2-thienyl)-2-amino-1,3-propanediol (M. P. 110–115° C. crude).

A mixture consisting of 4.5 g. of (dl)-B-1-(5-nitro-2-thienyl)-2-amino-1,3-propanediol and 25 ml. of methyl dichloroacetate is heated at a temperature of 100° C. for a period of one and a half hours. The residue is washed with petroleum ether and extracted with boiling ethylene dichloride. The solvent is evaporated under reduced pressure to obtain a crystalline product consisting of (dl)-B-1-(5-nitro-2-thienyl)-2-dichloroacetamido-1,3-propanediol. This product can be purified by recrystallization from water; M. P. 131.5–132.0° C.

The formula of this compound is

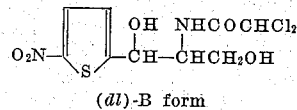

(dl)-B form

Analysis calculated for $C_9H_{10}Cl_2N_2O_5S$: C, 32.84; H, 3.06; N, 8.51; S, 9.74. Found: C, 32.67; H, 3.39; N, 8.45; S, 9.83.

The racemic mixture of (dl)-B-1-(5-nitro-2-thienyl)-2-dichloroacetamido-1,3-propanediol is further characterized by the fact that it exhibits a λ max at 330 mµ and a molecular coefficient (ε max) of 8,890 (aqueous solution) on ultra violet absorption spectrum analysis.

The new product, (dl)-B-1-(5-nitro-2-thienyl)-2-dichloroacetamido-1,3-propanediol, is strongly active bacteriostatically. It has also given evidence of great value as a bactericide, particularly against organisms, such as, for example, Shigella paradysenteriae, Escherichia coli, Bacillus subtilis and Salomonella typhosa.

By employing the corresponding (dl)-A-base in the above procedure one obtains (dl)-A-1-(5-nitro-2-thienyl)-2-dichloroacetamido-1,3-propanediol; M. P. 168.5–169.5° C.

Analysis calculated for $C_9H_{10}Cl_2N_2O_5S$: C, 32.84; H, 3.06; N, 8.51. Found: C, 33.02; H, 3.32; N, 8.39.

The corresponding A diastereoisomeric pair prior to resolution exhibits a λ max at 330 mµ and a ε max of 9,260 (aqueous solution) on ultra violet absorption spectrum analysis.

The optically active forms (d and l) of B-1-(5-nitro-2-thienyl)-2-dichloroacetamido-1,3-propanediol can be prepared by the following procedure:

10.9 g. of (dl)-B-1-(5-nitro-2-thienyl)-2-amino-1,3-propanediol is dissolved in a solution of 11.6 g. of d-camphor sulfonic acid in 410 ml. of isopropanol by warming the mixture briefly on a steam bath. The resulting solution is allowed to stand. The first isomer to separate from the solution is the (d)-camphor sulfonic acid salt of (l)-B-1-(5-nitro-2-thienyl)-2-amino-1,3-propanediol. On purification by recrystallization from isopropanol this salt has a M. P. 185–186° C. and $[\alpha]_D^{25°}+5.72°$ (aqueous solution at a concentration of 40 mg./ml.).

Analysis calculated for $C_{17}H_{26}N_2O_8S$: C, 45.32; H, 5.82; N, 6.22. Found: C, 45.28; H, 6.05; N, 6.32.

After removal of the (d)-acid salt of the (l)-base, the corresponding (d)-acid salt of the isomeric (d)-base is recovered from the combined filtrates. On purification by recrystallization from isopropanol the salt has a M. P. 172.5–173.5° C. and $[\alpha]_D^{25°}+20.7°$ (aqueous solution at a concentration of 40 mg./ml.).

Analysis calculated for $C_{17}H_{26}N_2O_8S$: C, 45.32; H, 5.82; N, 6.22. Found: C, 45.61; H, 6.15; N, 6.35.

The (d)-camphor sulfonic acid salt of (l)-B-1-(5-nitro-2-thienyl)-2-amino-1,3-propanediol obtained above is dissolved in water and the solution made alkaline to pH 9–10 with ammonium hydroxide. The solution is then extracted with ethyl acetate. The extracts are dried and evaporated under reduced pressure giving (l)-B-1-(5-nitro-2-thienyl)-2-amino-1,3-propanediol. This compound may be represented by the formula

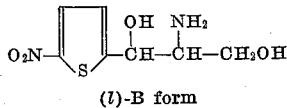

(l)-B form

By a similar procedure one may obtain (d)-B-1-(5-nitro-2-thienyl)-2-amino-1,3-propanediol from the (d)-camphor sulfonic acid salt of (d)-B-1-5-nitro-2-thienyl)-2-amino-1,3-propanediol.

(l)-B-1-(5-nitro - 2 - thienyl) - 2 - dichloroacetamido-1,3-propanediol is prepared by reacting the (l)-B-base with an excess of methyl dichloroacetate as described above for the case of the (dl)-B-isomer. On purification by recrystallization from ethylene dichloride the pure (l)-B-1-(5-nitro-2-thienyl) - 2 - dichloroacetamido - 1,3-propanediol has a M. P. 107.5°–107.7° C. and $[\alpha]_D^{25°}-153°$, and exhibits a λ max with a molecular extinction coefficient (ε max) of 9,270.

Analysis calculated for $C_9H_{10}Cl_2N_2O_5S$: C, 32.84; H, 3.06; N, 8.51. Found: C, 33.11; H, 3.17; N, 8.61.

(d)-B-1-(5-nitro-2 - thienyl) - 2 - dichloroacetamido-1,3-propanediol is prepared by a similar procedure. On purification by recrystallization from ethylene dichloride the pure (d)-B-1-(5-nitro-2-thienyl)-2-dichloroacetamido-1,3-propanediol has M. P. 106.5–107.5° C. and $[\alpha]_D^{25°}+150°$.

Analysis calculated for $C_9H_{10}Cl_2N_2O_5S$: C, 32.84; H, 3.06; N, 8.51. Found: C, 32.85; H, 3.26; N, 8.44.

*Example 2*

Preparation of (dl) - B - 1-(5-bromo-2-thienyl)-2-dichloroacetamido-1,3-propanediol

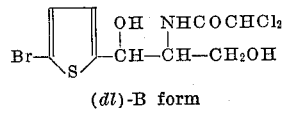

(dl)-B form 5-bromo-2-acetylthiophene is prepared by the aceylation of 2-bromothiophene using acetic anhydride and 85% orthophosphoric acid according to the method of Hartough and Conley (J. Am. Chem. Soc. 69, 3096 (1947)).

A solution of 820 g. of 5-bromo-2-acetylthiophene in one liter of glacial acetic acid is irradiated with ultraviolet light. To this solution there is added 640 g. of bromine with stirring over a period about two hours. The temperature of the reaction mixture is maintained by means of an ice bath at a temperature of from about 15 to 20° C. The solution is stirred for a period of two hours after the bromine addition. During this two hour period a stream of dry nitrogen is passed thru the solution to sweep out hydrogen bromide.

The reaction mixture is then poured into about 2 liters of ice water. A solid product (M. P. 93–93.5 when purified by recrystallization from carbon tetrachloride) is collected on a filter, washed with water, and dried. The product is dissolved in about 2 liters of chloroform.

The chloroform solution obtained as above described is added to a mixture consisting of 585 g. of hexamethylenetetramine and 2 liters of chloroform. The temperature of the resulting mixture rises rapidly. The reaction is moderated using an ice bath. After the initial exothermic reaction has subsided, the stirred mixture is maintained at a temperature of about 60° C. for a period of four hours. The mixture is cooled and the solid, which has separated, is collected, washed successively with absolute ethanol and ether, and dried. The product consisting of N-(5-bromo-2-thenoylmethyl)hexamethylenetetraminium bromide (M. P. 169.5° C. decomposed) has the formula

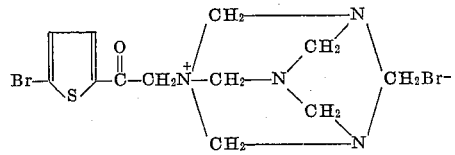

Analysis calculated for $C_{12}H_{16}Br_2N_4OS$: Br, 37.68. Found: Br, 38.05.

A mixture consisting of 1210 g. of N-(5-bromo-2-thenoylmethyl)hexamethylenetetraminium bromide, 1.2 liters of concentrated hydrochloric acid, and 2.5 liters of 95 per cent ethanol is heated at a temperature of 50° C. for a period of about one and one-half hours. The mixture is then cooled in an ice bath. The solid material consisting of ammonium halides plus some of the desired [(5 - bromo - 2 - thenoyl) - methyl]amine hydrochloride, which has separated, is collected on a filter and after drying amounts to about 1000 g. This mixture is stirred for a period of 15 minutes at a temperature of 10° C. with 1800 ml. of water. The undissolved solid, consisting mainly of N-[(5-bromo-2-thenoyl)methyl]amine hydrochloride, is collected on a filter and washed first with absolute ethanol, then with ether, and finally air-dried.

Upon concentrating the filtrate by distillation under reduced pressure, an additional amount of [(5-bromo-2-thenoyl)methyl]amine hydrochloride separates. The precipitated material is collected, washed with ethanol and ether, and dried. The total product consisting of [(5-bromo-2-thenoyl)methyl]amine hydrochloride is used without further purification. It has the following formula

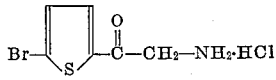

Analysis calculated for $C_6H_7BrClNOS$: N, 5.46. Found: N, 5.45.

A mixture consisting of 1,280 g. of [(5-bromo-2-thenoyl)methyl]amine hydrochloride and 3 liters of water is cooled to a temperature of about 0° C. 1,020 grams of acetic anhydride is added thereto. To the resulting mixture there is added a solution of 1,358 g. of sodium acetate trihydrate in 2.5 liters of water over a period of about ten minutes. During this addition the reaction mixture is kept at a temperature below 10° C. After the temperature of the mixture has risen to about 20° C., the mixture is acidified with concentrated hydrochloric acid. A solid product which separates from the solution is collected, washed and dried.

An additional quantity of the solid product is obtained by saturating the combined filtrates and washings with sodium chloride and extracting with five 700 ml. portions of ethyl acetate. The combined ethyl acetate extracts are dried over sodium sulfate and concentrated under reduced pressure to a volume of about 350 ml. One liter of petroleum ether is added to the warm concentrate. Upon cooling the mixture in an ice bath, crystals are deposited. They are collected and dried in vacuo. The crystalline product so obtained is N-(5-bromo-2-thenoylmethyl)acetamide and has the formula

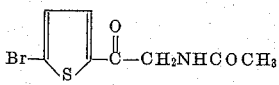

This compound may be purified by recrystallization from water or aqueous ethanol to give a product with M. P. 143–144° C.

Analysis calculated for $C_8H_8BrNO_2S$: C, 36.65; H, 3.07; N, 5.34. Found: C, 36.58; H, 3.06; N. 5.22.

To a mixture consisting of 786 g. of (dl)-N-[(5-bromo-2-thenoyl)methyl]acetamide, 2,240 ml. of 95% ethanol and 388 ml. of 36–38% aqueous formaldehyde there is added 30.2 g. of sodium bicarbonate. The reaction mixture is stirred for a period of about one hour while at a temperature of about 35° C. The stirred mixture cools to room temperature in a period of about 3 hours. The insoluble material which separates is collected and washed with a small amount of cold water. It is dried overnight in a vacuum oven at a temperature of from about 60 to 70° C. The product obtained is mainly (dl)-N-[2-hydroxy-1-(5-bromo-2-thenoyl)ethyl]acetamide, which has the formula

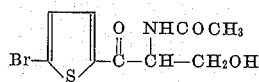

This product when purified by recrystallization from ethyl acetate has M. P. 140–141° C.

Analysis calculated for $C_9H_{10}BrNO_3S$: N, 4.80. Found: N, 4.59.

A solution of 3.8 g. of 95% sodium borohydride in 75 ml. of methanol is added over a period of about 25 minutes to a mixture consisting of 103 g. of (dl)-N-[2-hydroxy-1-(5-bromo-2-thenoyl)ethyl]acetamide and 350 ml. of methanol. The temperature of the reaction mixture is maintained in the range of from 20 to 25° C. throughout the addition. The reaction mixture is stirred for an additional period of about fifteen minutes. The methanol is then removed from the mixture by distillation under reduced pressure.

The residue is mixed with 300 ml. of water and warmed on the steam bath for a period of about one-half hour. The resulting aqueous solution is saturated with sodium chloride and extracted five times with 200 ml. portions of ethyl acetate. The ethyl acetate extracts are combined and dried over sodium sulfate. The combined extract is evaporated to dryness under reduced pressure.

The residual (dl)-AB-1-(5-bromo-2-thienyl)-2-acetamido-1,3-propanedial is triturated with 50 ml. of ether, filtered, and washed twice with 15 ml. portions of ether. This product is a mixture of space isomers and has the formula

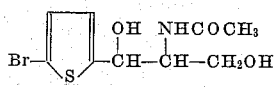

The (dl)-A form and the (dl)-B form may be separated if desired by fractional crystallization from ethyl acetate or dioxane. An alternative method of separating these two forms is to acetylate the mixture of these forms prepared as above described. Acetylation is carried out by heating the mixture on a steam bath for a period of one-half hour with an excess of acetic anhydride and a corresponding volume of pyridine. In this way a mixture of the (dl)-A and (dl)-B forms of the corresponding triacetate is formed which may be represented by the following formula

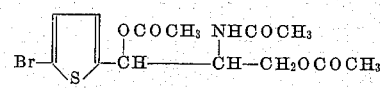

These forms are then separated by fractional crystallization from ethyl acetate, ethanol, or mixtures of ethyl acetate and ethanol.

A mixture consisting of 30 g. of (dl)-B-1-(5-bromo-2-thienyl)-2-acetamido-1,3-propanediol and 300 ml. of 1.5 N hydrochloric acid is heated on a steam bath for a period of about one and one-half hours. The resulting solution is cooled in an ice bath and made alkaline (pH 9–10) with 6 N aqueous sodium hydroxide. A precipitate of (dl)-B-1-(5-bromo-2-thienyl)-2-amino-1,3-propanediol separates. It is collected and washed with a small amount of ice water. This product has the formula

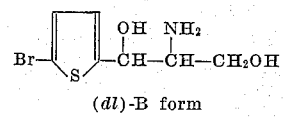

(dl)-B form

A mixture consisting of 6.0 g. of (dl)-B-1-(5-bromo-2-thienyl)-2-amino-1,3-propanediol and 25 ml. of methyl dichloroacetate is heated on a steam bath for a period of about 1.5 hours. The reaction mixture is cooled and extracted with 100 ml. of petroleum ether. The residue is washed twice with 50 ml. of petroleum ether and then extracted with two 100 ml. portions of boiling ethyl acetate. The combined hot ethyl acetate extracts are treated with decolorizing charcoal. The ethyl acetate is then removed by distillation under reduced pressure.

The residual (dl)-B-1-(5-bromo-2-thienyl)-2-dichloroacetamido-1,3-propanediol is purified by recrystallization from aqueous ethanol. The formula of this product is

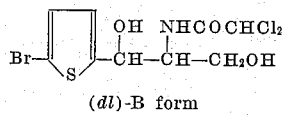

(dl)-B form

Example 3

Preparation of (dl)-B-1-(2-thienyl)-2-dichloroacetamido-1,3-propanediol,

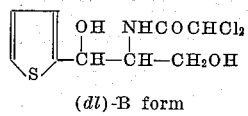

(dl)-B form

To a mixture consisting of 50 g. of [(2-thenoyl)-methyl]amine hydrochloride and 560 ml. of ethylene dichloride there is added 41.4 g. of precooled dichloroacetyl chloride dissolved in 140 ml. of ethylene dichloride. Reaction temperature is maintained between 0 and 5° C. Triethylamine (25 g.) is added dropwise over a period of 15 minutes. The reaction is stirred continuously for a period of one hour while its temperature is maintained at from 0° to 5° C. The stirred mixture is allowed to reach room temperature. It is then filtered.

The filtrate is washed successively with 300 ml. portions of water, 1.2 N hydrochloric acid, water and 10% sodium bicarbonate. It is dried over sodium sulfate, and concentrated by distillation under reduced pressure. The residue is recrystallized from 1:1 Skellysolve B-ethylene dichloride to improve its purity and consists of N-(2-thenoylmethyl)dichloroacetamide. It has the following formula

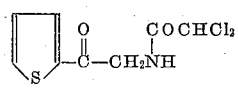

When highly pure, the above compound has a M. P. of 136.5–137.5° C. Analysis calculated for $C_8H_7O_2NSCl_2$: C, 38.11; H, 2.80; Cl 28.13; S, 12.72. Found: C, 38.11; H, 3.05; Cl 27.90; S, 12.73.

A mixture consisting of 60 g. of N-(2-thenoylmethyl)-dichloroacetamide, 480 ml. of methanol, 40 g. of 36–38% aqueous formaldehyde and 1.9 g. of sodium bicarbonate is prepared, stirred and heated to a temperature of about 35° C. for a period of about one hour. Stirring of the mixture is continued while the mixture cools to room temperature. The cooling requires about one and one-half hours. The mixture is chilled and poured into 800 g. of ice and water. The precipitate which has separated is collected, washed with cold water, and dried. The product is (dl)-N-[2-hydroxy-1-(2-thenoyl)ethyl]dichloroacetamide and has the formula

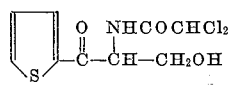

When highly pure, the compound has a M. P. of 118.5–119.5° C. Analysis calculated for $C_9H_9O_3NSCl_2$: C, 38.31; H, 3.21; Cl, 25.13; S, 11.36. Found: C, 38.85; H, 3.63; Cl, 25.18; S, 10.97.

A solution of 1.9 g. of 95% sodium borohydride in 40 ml. of methanol is added over a period of about 20 minutes to a solution of 49.6 g. of (dl)-N-[2-hydroxyl-1-(2-thenoyl)ethyl]dichloroacetamide in 200 ml. of methanol. The methanol solution of (dl)-N-[2-hydroxyl-1-(2-thenoyl)ethyl]dichloroacetamide is maintained at a temperature of about 20–25° C. throughout the sodium borohydride addition. The reaction mixture is stirred for a period of 15 minutes following the complete addition of the sodium borohydride solution. The methanol is removed by distillation under reduced pressure.

The residue is mixed with 40 ml. of water and warmed on the steam bath for a period of about one-half hour. The aqueous solution is then saturated with sodium chloride and extracted with ethyl acetate. The ethyl acetate extracts are dried with sodium sulfate, and concentrated by distillation under reduced pressure. The residue is triturated with 25 ml. of ether. The solid product is then collected and washed with ether. The product, (dl)-AB-1-(2-thienyl)-2-dichloroacetamido-1,3-propanediol, is a mixture of space isomers which may be represented by the following formula:

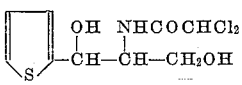

Separation of the (dl)-A and (dl)-B forms of this product may be effected at this point by fractional crystallization from ethyl acetate or dioxane.

In an alternate method for the preparation of the pure (dl)-A or (dl)-B forms of the product, 20 g. of the (dl)-AB-1-(2-thienyl)-2-dichloroacetamido-1,3-propanediol is mixed with 40 ml. of acetic anhydride and 40 ml. of pyridine. The resulting solution is heated on the steam bath for a period of about one-half hour. The excess anhydride and pyridine are removed by distillation under reduced pressure.

The residue consists primarily of a mixture of the isomeric 1-(2-thienyl)-2-dichloroacetamido-1,3-propanediol diacetates and may be represented by the formula,

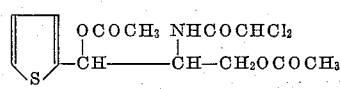

By fractional crystallization of this crude product from absolute ethanol, one may separate the (dl)-A and the (dl)-B forms of the above compound.

When highly pure, the (dl)-A and (dl)-B forms melt respectively at 93.5–94.5° C. and 122–123° C. Analysis calculated for $C_{13}H_{15}O_5NSCl_2$: C, 42.40; H, 4.11; S, 8.71. Found (dl)-A: C, 42.47; H, 4.23; S, 8.49. Found (dl)-B: C, 42.33; H, 4.52; S, 8.45.

1 g. of (dl)-B-1-(2-thienyl)-2-dichloroacetamido-1,3-propanediol diacetate is stirred with 50 ml. of 0.2 N aqueous sodium hydroxide and 50 ml. of acetone at a temperature of from about 0 to 5° C. for a period of about one hour. The mixture is then carefully neutralized by the addition of aqueous hydrochloric acid. The acetone is evaporated under reduced pressure.

The resulting aqueous solution is extracted five times with 25 ml. portions of ethyl acetate. The combined ethyl acetate extracts are dried with magnesium sulfate, and concentrated to dryness by distillation under reduced pressure. The residue is recrystallized from ethyl acetate. In this way the pure (dl)-B-1-(2-thienyl)-2-dichloroacetamido-1,3-propanediol is obtained.

By carrying out a similar hydrolysis starting with (dl)-A-1-(2-thienyl)-2-dichloroacetamido-1,3 - propanediol diacetate, the pure (dl)-A-1-(2-thienyl)-2-dichloroacetamido-1,3-propanediol can be prepared. When highly pure, the compound has a M. P. of 151.5–153° C. Analysis calculated for $C_9H_{11}O_3NSCl_2$: C, 38.04; H, 3.90; S, 11.28. Found: C, 37.77; H, 4.12; S, 11.28.

*Example 4*

Preparation of (dl)-B-1-(5-methyl-2-thienyl)-2-dichloroacetamido-1,3-propanediol,

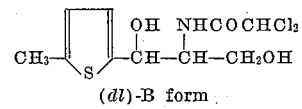

(dl)-B form

To a suspension of 623 g. of anhydrous aluminum chloride in 2670 ml. of carbon tetrachloride there is added 942 g. of bromoacetyl bromide over a period of about one-half hour. The suspension is stirred and maintained at a temperature of about 0° C. throughout the addition. 392 g. of 2-methylthiophene is then added to the resulting mixture over a period of about four hours. During this addition the temperature of the reaction mixture is kept below 5° C. After the addition of 2-methylthiophene is completed, the reaction mixture is stirred for an additional hour.

The reaction mixture is hydrolyzed by pouring into a stirred mixture consisting of ice and hydrochloric acid. The carbon tetrachloride layer is separated, washed with aqueous sodium carbonate solution, and dried. The carbon tetrachloride solution of 5-methyl-2-bromoacetylthiophene is used directly in the next reaction.

A mixture consisting of 585 g. of hexamethylenetetramine and 1.5 liters of chloroform is added to a carbon tetrachloride solution of 5-methyl-2-bromoacetylthiophene. The temperature of the resulting mixture rises rapidly. The reaction is moderated by external cooling. After the initial exothermic reaction has subsided, the temperature of the reaction mixture is maintained at a temperature of about 50° C. for a period of about four hours.

The reaction mixture is cooled and the solid product, which has separated, is collected. The product is washed with 400 ml. of ether and dried under reduced pressure. The principal ingredient of the residue having the formula shown below is N-(5-methyl-2-thenoylmethyl)hexamethylenetetraminium bromide.

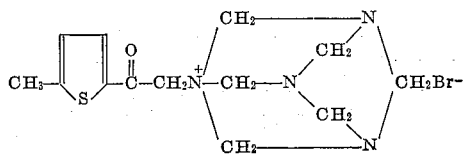

A mixture consisting of 1020 g. of N-(5-methyl-2-thenoylmethyl)hexamethylenetetraminium bromide, 1200 ml. of concentrated hydrochloric acid, and 2 liters of 95% ethanol is heated at a temperature of about 50° C. for a period of about one and one-half hours. The mixture is then cooled in an ice bath.

The solid material consisting of ammonium halides and some of the desired [(5-methyl-2-thenoyl)methyl]amine hydrochloride, which has separated, is collected on a filter. The solid material is dried and weighed approximately 450 g. It is stirred for a period of 15 minutes at a temperature of 10° C. with 1600 ml. of water. The undissolved solid consisting mainly of [(5-methyl-2-thenoyl)-methyl]amine hydrochloride is collected on a filter, washed with absolute ethanol, then with ether and finally air-dried.

Upon concentrating the filtrate by distillation under reduced pressure, an additional amount of [(5-methyl-2-thenoyl)methyl]amine hydrochloride separates. It is collected, washed successively with absolute ethanol and ether and then dried. The total product consisting of [(5-methyl-2-thenoyl)methyl]amine hydrochloride is used without further purification. It has a M. P. of 215–218° C. with decomposition. [(5-methyl-2-thenoyl)methyl]amine hydrochloride may be represented by the formula

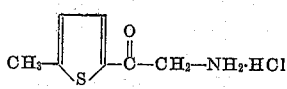

To a mixture consisting of 19.2 g. of [(5-methyl-2-thenoyl)methyl]amine hydrochloride and 200 ml. of ethylene dichloride there is added in one portion 44.3 g. of dichloracetyl chloride. The temperature of the stirred reaction mixture is held between 0–5° C. during the addition of the dichloroacetyl chloride. A solution prepared by dissolving 24 g. of sodium hydroxide pellets in enough water to make 40 ml. of solution is added slowly to the reaction mixture which is maintained at a temperature of from 0 to 5° C. The mixture is stirred for an hour after the addition is completed and for another hour while the reaction mixture warms to room temperature. The mixture is then filtered.

The solid, which is collected upon filtration of the mixture, is extracted with 200 ml. of boiling ethylene dichloride and filtered. The filtrate is evaporated to dryness. A yellow product is obtained.

The original filtrate is separated from the heavy aqueous layer, washed twice with water, then with 10% sodium bicarbonate solution and dried over anhydrous magnesium sulfate. The ethylene dichloride solution is evaporated to dryness. An additional quantity of yellow product is thus obtained.

The two portions of product are combined and recrystallized from a 1:1 mixture of Skellysolve B-ethylene dichloride. When highly pure, this compound, N-(5-methyl-2-thenoylmethyl)dichloracetamide, has a M. P. of 170–171° C. Its formula is shown below:

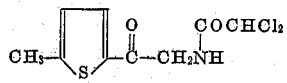

Analysis calculated for $C_9H_9O_2NSCl_2$: C, 40.61; H, 3.41; S, 12.05. Found C, 40.51; H, 3.66; S, 12.02.

A mixture consisting of 66.5 g. of N-(5-methyl-2-thenoylmethyl)dichloroacetamide, 800 ml. of methanol, 37.7 g. of 36–38% aqueous formaldehyde and 1.9 g. of sodium bicarbonate is placed in a suitable reaction vessel. The mixture is stirred and maintained at a temperature of about 35° C. for a period of about two hours. The agitated mixture is permitted to cool to room temperature. This requires about one and one-half hours. The reaction mixture is then chilled. A precipitate, which has formed, is collected and washed with cold water. The filtrate is poured into 1500 g. of ice and water. The solid which separates is collected by filtration, washed with cold water and dried. It is recrystallized from ethyl acetate and combined with the main product collected above. The combined product is recrystallized from ethyl acetate. The product (dl)-N-[2-hydroxy-1-(5-methyl-2-thenoyl)ethyl]dichloroacetamide, is dried preparatory to its use in the next step. It may be represented by the following formula:

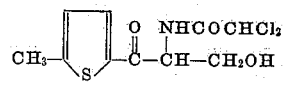

When pure, this compound has a M. P. of 153.5–154.5° C. Analysis calculated for $C_{10}H_{11}O_3NSCl_2$: C, 40.55; H, 3.74; Cl, 23.94. Found C, 40.65; H, 3.82; Cl, 24.12.

A solution of 0.5 g. of 95% sodium borohydride in 30 ml. of methanol is added over a period of about 20 minutes to a solution of 6.9 g. of (dl)-N-[2-hydroxyl-1-(5-methyl-2-thenoyl)ethyl]dichloroacetamide in 40 ml. of methanol. The reaction mixture is maintained at a temperature of from 20 to 25° C. during the addition of the methanolic solution. The mixture is stirred for a period of about 15 minutes after the sodium borohydride solution has been added. The methanol is removed by distillation under reduced pressure.

The residue is mixed with 20 ml. of water and warmed on the steam bath for a period of about one-half hour. The aqueous solution is then saturated with sodium chloride and extracted several times with ethyl acetate. The ethyl acetate extracts are dried with sodium sulfate. The ethyl acetate itself is removed by distillation under reduced pressure. The residue is triturated with 30 ml. of ether. A solid product which separates is collected and washed twice with 10 ml. portions of ether. The product, (dl)-AB-1-(5-methyl-2-thienyl)-2-dichloroacetamido-1,3-propanediol, may be represented by the formula,

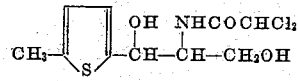

The (dl)-A and (dl)-B forms of this product may be separated at this point in the synthesis by fractional crystallization from ethyl acetate or dioxane.

An alternate method for the preparation of the pure (dl)-A or (dl)-B form is as follows: 20 g. of the (dl)-AB-1-(5-methyl-2-thienyl)-2-dichloroacetamido-1,3-propanediol is mixed with 40 ml. of acetic anhydride and 40 ml. of pyridine. The resulting solution is heated on the steam bath for a period of about one-half hour. The excess anhydride and pyridine are then removed by distillation under reduced pressure. The residue consists primarily of a mixture of the isomeric compounds, (dl)-AB-1-(5-methyl-2-thienyl)-2-dichloroacetamido-1,3-propanediol diacetate. The following formula is representative:

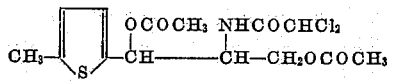

By fractional crystallization of the diacetates from Skellysolve B, one may separate the (dl)-A and the (dl)-B forms. When highly pure the (dl)-A form has a M. P. of 81–82° C. Analysis calculated for $C_{14}H_{17}O_5NSCl_2$: C, 43.99; H, 4.48; S, 8.39. Found: C, 44.28; H, 4.64; S, 8.19.

(dl)-B-1-(5-methyl-2-thienyl)-2-dichloroacetamido-1,3-propanediol diacetate (1 g.) is stirred with 50 ml. of 0.2 N aqueous sodium hydroxide and 50 ml. of acetone at a temperature of about 0° C. for a period of about one hour. The reaction mixture is then carefully neutralized by the addition of aqueous hydrochloric acid. Acetone is removed by distillation under reduced pressure. The resulting aqueous solution is extracted five times with 25 ml. portions of ethyl acetate. The combined ethyl acetate extracts are dried with magnesium sulfate, and evaporated to dryness under reduced pressure. The residue is further purified by recrystallization from ethyl acetate. In this way pure (*dl*)-B-1-(5-methyl-2-thienyl)-2-dichloroacetamido-1,3-propanediol is obtained.

By carrying out a similar hydrolysis starting with the (*dl*)-A-1-(5-methyl-2-thienyl)-2-dichloroacetamido-1,3-propanediol diacetate, the pure (*dl*)-A-1-(5-methyl-2-thienyl)-2-dichloroacetamido-1,3-propanediol may be prepared. When highly pure, the (*dl*)-A form has a M. P. of 149–150° C. Analysis calculated for $C_{10}H_{13}O_3NSCl_2$: C, 40.28; H, 4.39; Cl, 23.78. Found: C, 40.12; H, 4.63; Cl, 23.80.

*Example 5*

Preparation of (*dl*)-B-1-(5-bromo-2-thienyl)-2-dichloroacetamido-1,3-propanediol,

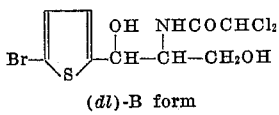

(*dl*)-B form

To a mixture consisting of 17.3 g. of [(5-bromo-2-thenoyl)methyl]amine hydrochloride and 250 ml. of ethylene dichloride there is added in one portion 29.5 g. of dichloroacetyl chloride. The stirred reaction mixture is kept at a temperature of from 0 to 5° C. during the addition of the dichloroacetyl chloride. A solution prepared by dissolving 16 g. of sodium hydroxide pellets in enough water to make 25 ml. of final solution is added slowly to the reaction mixture, which is maintained at 0–5° C. The reaction mixture is stirred for a period of 15 minutes and then filtered.

The solid which is obtained is collected, extracted twice with 250 ml. of boiling ethylene dichloride and filtered. The filtrate is evaporated to dryness. A light orange solid product is obtained.

The original reaction mixture filtrate is separated from the heavy aqueous layer, washed twice with water, then with 10% sodium bicarbonate and dried over anhydrous sodium sulfate. The ethylene dichloride solution is evaporated to dryness. An additional quantity of orange solid product is obtained.

The two portions of product obtained in the above manner are combined and recrystallized from a 1:1 mixture of Skellysolve B-ethylene dichloride. When highly pure, this compound, N-(5-bromo-2-thenoylmethyl)dichloroacetamide, has a melting point of 151–151.5° C.

The compound may be represented by the formula,

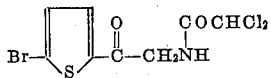

Analysis calculated for $C_8H_6O_2SNBrCl_2$: C, 29.02; H, 1.82; S, 9.68. Found: C, 29.05; H, 2.10; S, 9.50.

A mixture consisting of 25.6 g. of N-(5-bromo-2-thenoylmethyl)dichloroacetamide, 120 ml. of methanol, 11.6 g. of 36–38% aqueous formaldehyde and 0.6 g. of sodium bicarbonate is stirred and maintained at a temperature of about 35° C. for a period of about one hour. The mixture is continuously stirred while it cools to room temperature over a period of about one and one-half hours. It is then thoroughly cooled in an ice bath.

A precipitate consisting of (*dl*)-N-[2-hydroxy-1-(5-bromo-2-thenoyl)ethyl]dichloroacetamide is collected, washed with a small amount of water and dried. The filtrate is poured slowly onto 200 g. of ice and water. An additional amount of product which separates is collected, dried and recrystallized from benzene. The combined product is recrystallized from ethyl acetate. When highly pure, this compound, (*dl*)-N-[2-hydroxy-1-(5-bromo-2-thenoyl)ethyl]dichloroacetamide, has a melting point of 142.5–143° C. It has the formula

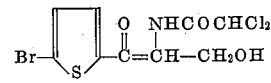

Analysis calculated for $C_9H_8O_3BrCl_2$: C, 29.94; H, 2.23; S, 8.88. Found: C, 30.16; H, 2.40; S, 8.98.

A solution of 0.6 g. of 95% sodium borohydride in 60 ml. of methanol is added dropwise over a period of about 20 minutes to a solution of 17.2 g. of (*dl*)-N-[2-hydroxy-1-(5-bromo-2-thenoyl)ethyl]dichloroacetamide in 175 ml. of methanol. The reactants are kept at a temperature of from 20 to 25° C. by external cooling. The reaction mixture is stirred for a period of about 15 minutes.

After methanol is removed by distillation under reduced pressure, the residue is mixed with 20 ml. of water and warmed on the steam bath for a period of about one-half hour. The aqueous solution is saturated with sodium chloride and extracted with ethyl acetate. The ethyl acetate extracts are dried with sodium sulfate. Ethyl acetate is removed by distillation under reduced pressure. The residue is triturated with 30 ml. of ether, collected, washed with ether, and dried.

The product so obtained is a mixture of space isomers of 1-(5-bromo-2-thienyl)-2-dichloroacetamido-1,3-propanediols and may be represented by the formula,

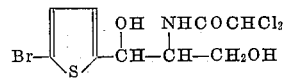

Separation of the (*dl*)-A and (*dl*)-B forms of the above isomeric product may be separated at this point by fractional crystallization from ethyl acetate or dioxane.

An alternative method for the preparation of the pure (*dl*)-A or (*dl*)-B forms of the product comprises mixing 20.0 g. of the (*dl*)-AB-1-(2-thienyl)-2-dichloroacetamido-1,3-propanediol with 40 ml. of acetic anhydride in 40 ml. of pyridine and heating the resulting solution on the steam bath for a period of about one-half hour. The excess acetylating agent and solvent are then removed by distillation under reduced pressure. The residue consists primarily of a mixture of the isomeric diacetates of 1-(5-bromo-2-thienyl)-2-dichloroacetamido-1,3-propanediol. The following formula is representative of the product so obtained:

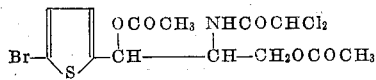

By fractional crystallizations of this crude product from absolute ethanol, the (*dl*)-A and the (*dl*)-B forms are satisfactorily separated.

1 g. of (*dl*)-B-1-(5-bromo-2-thienyl)-2-dichloroacetamido-1,3-propanediol diacetate is stirred with a mixture consisting of 50 ml. of 0.2 N aqueous sodium hydroxide and 50 ml. of acetone for a period of about one hour. The reactants are maintained at a temperature of 0° C. throughout the one hour period. The mixture is then carefully neutralized by the addition of aqueous hydrochloric acid. The acetone is removed by distillation under reduced pressure. The resulting aqueous solution is extracted five times with 25 ml. portions of ethyl acetate. The combined ethyl acetate extracts are dried with magnesium sulfate, and then evaporated to dryness under reduced pressure. The residue consisting of (*dl*)-B-1-(5-bromo-2-thienyl)-2-dichloroacetamido-1,3-propanediol is recrystallized from ethyl acetate to enhance its purity.

By carrying out a similar hydrolysis starting with the (*dl*)-A-1-(5-bromo-2-thienyl)-2-dichloroacetamido-1,3-propanediol diacetate, (*dl*)-A-1-(5-bromo-2-thienyl)-2-dichloroacetamido-1,3-propanediol may be prepared.

Example 6

Preparation of (dl)-B-1-(3-methyl-5-nitro-2-thienyl)-2-dichloroacetamido-1,3-propanediol

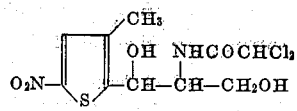

942 g. of bromoacetyl bromide is added to a suspension of 623 g. of anhydrous aluminum chloride in 2670 ml. of carbon tetrachloride and the resulting mixture cooled to a temperature of about 0° C. for a period of about one-half hour. To the mixture there is added 392 g. of 3-methylthiophene over a period of about four hours. During the addition of the 3-methylthiophene the temperature is maintained below 5° C. The reaction mixture is stirred for an additional hour prior to hydrolysis.

The reaction mixture is hydrolyzed by pouring it into a stirred mixture of ice and hydrochloric acid. The carbon tetrachloride layer is separated, washed with sodium carbonate solution, then with water, and dried using anhydrous sodium sulfate. The carbon tetrachloride is removed by distillation under reduced pressure. A residue is left which consists mainly of 3-methyl-2-bromoacetylthiophene. Some 4-methyl-2-bromoacetylthiophene is also formed in the reaction.

The crude 3-methyl-2-bromoacetylthiophene is dissolved in 1200 ml. of chloroform, and the resulting chloroform solution is added in one portion to a mixture consisting of 585 g. of hexamethylenetetramine and 1.5 liters of chloroform. The temperature of the resulting mixture rises rapidly and the reaction is moderated using an ice bath. After the initial exothermic reaction has subsided, the reaction mixture is maintained at a temperature of about 60° C. by external heating with a steam bath for a period of about four hours. The reaction mixture is then cooled.

A solid product, which has separated, is collected, stirred briefly with 1 liter of absolute ethanol, filtered, collected, washed successively with 400 ml. of absolute ethanol and 400 ml. of ether, and dried. The N-3-methyl-2-thenoylmethyl)hexamethylenetetraminium bromide so obtained has the formula,

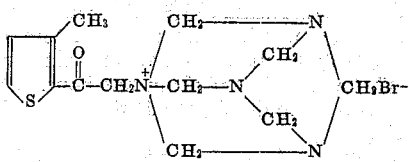

A mixture consisting of 1020 g. of N-(3-methyl-2-thenoylmethyl)hexamethylenetetraminium bromide, 1,200 ml. of concentrated hydrochloric acid and 2 liters of 95% ethanol is heated at a temperature of about 50° C. for about 1.5 hours. The mixture is cooled with an ice bath and the ammonium halides removed. The filtrate is concentrated under reduced pressure. The crystalline solid which separates is collected, washed with 95% ethanol and with ether, and dried. The [(3-methyl-2-thenoyl)methyl]amine hydrochloride so obtained has the formula,

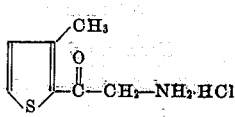

1,020 g. of acetic anhydride is added to a mixture consisting of 955 g. of [(3-methyl-2-thenoyl)methyl]amine hydrochloride and 2.5 liters of water previously cooled to a temperature of 0° C. To the resulting mixture there is added over a period of about 12 minutes a solution of 1,358 g. of sodium acetate trihydrate in 2.5 liters of water. During this addition the temperature of the mixture is kept below 10° C. and the mixture is stirred. The temperature of the stirred reaction mixture is allowed to rise to about 20° C. The mixture is then acidified with concentrated hydrochloric acid.

A solid product which has separated from the reaction mixture is collected, washed with water, and dried. An additional quantity of the product is obtained by saturating the combined filtrate and washings with sodium chloride and then extracting four times with 600 ml. of ethyl acetate. The combined ethyl acetate extracts are dried with sodium sulfate and concentrated under reduced pressure to a volume of about 350 ml. One liter of petroleum ether is added to the warm concentrate. The petroleum ether-concentrate is then cooled in an ice bath. An additional quantity of product crystallizes. The crystals are collected, dried, and added to the previous batch of N-(3-methyl-2-thenoylmethyl)acetamide.

The combined batches of N-(3-methyl-2-thenoylmethyl)-acetamide may be further purified, if desired, by recrystallization from aqueous ethanol. The product has the formula,

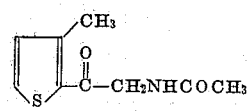

Solid sodium bicarbonate is added to a mixture consisting of 591 g. of N-(3-methyl-2-thenoylmethyl)acetamide, 1,100 ml. of water, and 452 ml. of 36–38% aqueous formaldehyde until the pH of the mixture is about 7.5–8. The reaction mixture is then stirred and heated at a temperature of 35° C. for a period of about one hour. The mixture is permitted to cool to room temperature in about three hours. Then it is cooled thoroughly in an ice bath.

A precipitate of (dl) - N - [2 - hydroxy-1-(3-methyl-2-thenoyl)ethyl]acetamide, which has separated, is collected and washed with a small amount of cold water and subsequently dried. The product has the formula,

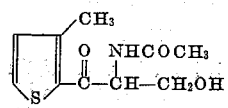

A solution of 3.8 g. of 95% sodium borohydride in 75 ml. of methanol is added over a period of about 20 minutes to a mixture consisting of 80 g. of (dl)-N-[2-hydroxy-1-(3-methyl-2-thenoyl)ethyl]acetamide and 300 ml. of methanol. The temperature of the reactants is maintained at from 20 to 25° C. by cooling the reactants with a water bath. The reaction mixture is stirred for a period of about fifteen minutes. The methanol is removed by distillation under reduced pressure.

The residual material is mixed with 250 ml. of water and warmed on the steam bath for a period of about one-half hour. The resulting aqueous solution is saturated with sodium chloride and extracted continuously in a liquid-liquid extractor with one liter of ethyl acetate. The ethyl acetate extract is dried. The ethyl acetate is removed by distillation under reduced pressure. The solid residue is triturated with 50 ml. of ether, collected, washed with ether and dried.

The product obtained in the above manner is a mixture of space isomers of 1-(3-methyl-2-thienyl)-2-acetamido-1,3-propanediol and may be represented by the following formula:

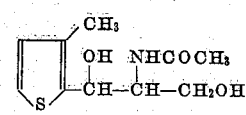

The (dl)-A and the (dl)-B forms may be separated if desired by fractional crystallization from ethyl acetate or dioxane. Alternately, the isomeric mixture described above may be acetylated in the following manner.

A mixture of 75 g. of (dl)-AB-1-(3-methyl-2-thienyl)-2-acetamido-1,3-propanediol is heated on a steam bath for a period of about one-half hour with a mixture consisting of 150 ml. of acetic anhydride and 150 ml. of pyridine. The excess acetylating mixture is then removed by distillation under reduced pressure. The residue consists primarily of a mixture of the isomeric triacetyl derivatives having the formula,

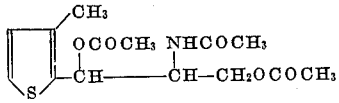

The (dl)-A and (dl)-B forms may be separated at this stage by fractional crystallization from ethanol.

The above procedure may also be used for the acetylation of (dl)-A or (dl)-B-1-(3-methyl-2-thienyl)-2-acetamido-1,3-propanediol.

A mixture consisting of 13.6 g. of (dl)-B-1-(3-methyl-2-thienyl)-2-acetamido - 1,3 - propanediol diacetate and 17.5 g. of acetic anhydride is cooled to a temperature of about 5° C. To this mixture there is added with rapid stirring 4.3 g. of yellow fuming nitric acid (density=1.5) over a period of about 40 minutes. The temperature of the reaction mixture is maintained between 0 and —5° C. during the additon. Stirring is continued for an additional period of about one-half hour. The reaction mixture is then poured onto 100 g. of ice and the resulting mixture neutralized by the addition of sodium bicarbonate.

The mixture neutralized with bicarbonate is extracted eight times with 50 ml. of ethyl acetate. The combined ethyl acetate extracts are dried with anhydrous magnesium sulfate. The ethyl acetate is removed by distillation under reduced pressure. The residue consists mostly of (dl)-B-1-(3 - methyl-5-nitro - 2 - thienyl)-2-acetamido-1,3-propanediol diacetate and has the following formula:

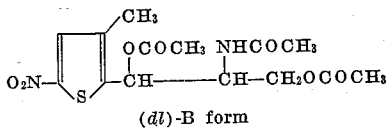

A mixture consisting of 10 g. of the crude (dl)-B-1-(3-methyl-5-nitro-2-thienyl)-2-acetamido-1,3- propanediol diacetate and 100 ml. of 1.5 N hydrochloric acid is heated on a steam bath for a period of about one and one-half hours. The reaction mixture is then concentrated by distillation under reduced pressure (bath temperature below 50° C.) to a volume of about 40 ml. The resulting concentrate is cooled in an ice bath and made alkaline (pH 9–10) by the addition of 6 N aqueous sodium hydroxide. The solid which precipitates is separated by filtration, collected and washed with a small amount of cold water.

The product consisting of (dl)-B-1-(3-methyl-5-nitro-2-thienyl)-2-amino-1,3-propanediol may be recrystallized if desired from a mixture of ethylene dichloride-isopropanol (3:1). Its formula is

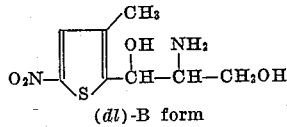

A mixture consisting of 3.0 g. of (dl)-B-1-(3-methyl-5-nitro-2-thienyl)-2-amino-1,3-propanediol and 25 ml. of methyl dichloroacetate is heated on a steam bath for a period of about one and one-half hours. The reaction mixture is cooled and extracted with 100 ml. of petroleum ether. The residue is washed twice with 50 ml. of petroleum ether, and extracted with two 100 ml. portions of boiling ethyl acetate.

The hot ethyl acetate extract is treated with decolorizing charcoal and filtered. The ethyl acetate is then removed from the filtrate by distillation under reduced pressure. The residue is recrystallized from aqueous ethanol to obtain the desired (dl)-B-1-(3-methyl-5-nitro-2-thienyl)- 2 - dichloroacetamido - 1,3 - propanediol. The compound so obtained has the formula,

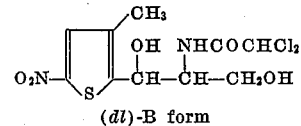

(dl)-A-1-(3 - methyl-5-nitro - 2 - thienyl) - 2-dichloroacetamido-1,3-propanediol can be obtained in a manner analogous to the above beginning with the nitration of (dl) - A - 1 - (3 - methyl-2-thienyl) - 2 - acetamido - 1,3-propanediol diacetate.

Example 7

Preparation of (dl)-B-1-(5-nitro-2 - thienyl) - 2 - acetamido-1,3-propanediol:

A mixture consisting of 1 g. of (dl)-B-1-(5-nitro - 2-thienyl)-2-acetamido-1,3-propanediol diacetate (prepared as in Example 1), 50 ml. of acetone, and 50 ml. of 0.2 N aqueous sodium hydroxide is stirred at a temperature of about 0° C. for a period of about one hour. The reaction mixture is then carefully neutralized with 6 N hydrochloric acid and the solution is concentrated to dryness under reduced pressure. The residue is extracted with hot ethyl acetate and the salt is removed by filtration. The ethyl acetate extract is then evaporated to dryness under reduced pressure and the crystalline residue is recrystallized from ethyl acetate. The product, (dl)-B-1-(5-nitro-2-thienyl)-2-acetamido-1,3-propanediol (M. P. 182.5–183.5°) has the following formula:

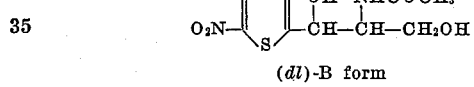

Analysis calculated for $C_9H_{12}N_2O_5S$: C, 41.53; H, 4.65; N, 10.76. Found: C, 41.62; H, 4.70; N, 10.54.

Example 8

Preparation of (dl)-B-1-(3-methyl - 5-nitro-2-thienyl)-2-acetamido-1,3-propanediol:

A mixture consisting of 1 g. of (dl)-B-1-(3-methyl-5-nitro-2-thienyl)-2-acetamido - 1,3-propanediol (prepared as in Example 6), 50 ml. of acetone and 50 ml. of 0.2 N sodium hydroxide solution is stirred at a temperature of about 0° C. for a period of about one hour. The reaction mixture is neutralized by addition of 6 N hydrochloric acid.

The neutralized mixture is concentrated to dryness by distillation under reduced pressure. The residue is extracted with boiling ethyl acetate and the extract is filtered to remove the sodium chloride. The ethyl acetate extract is evaporated to dryness under reduced pressure. The residue is recrystallized from aqueous ethanol. The product has the formula,

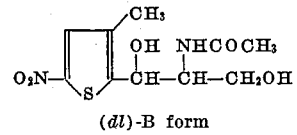

Example 9

Preparation of (dl)-B-1-(5-bromo-2-thienyl) - 2-thenamido)-1,3-propanediol:

1 g. of (dl)-B-1-(5-bromo-2-thienyl)-2-amino-1,3-propanediol of Example 2 is mixed with 25 ml. of ethyl acetate. 0.75 g. of 2-thenoyl chloride is added, while the reaction mixture is maintained at a temperature of about 0° C. The resulting solution is allowed to stand with occasional stirring for a period of about one-half hour and then 25 ml. of water is added. The ethyl acetate layer is removed and washed with dilute hydrochloric acid, sodium bicarbonate solution, and finally with water. The ethyl acetate is distilled off under reduced pressure and the residue is recrystallized from aqueous ethanol. The product so obtained has the formula,

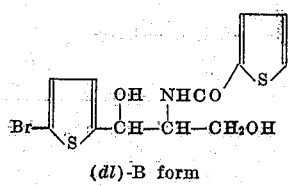

(dl)-B form

Example 10

Preparation of (dl)-B-1-(3-methyl-5-nitro-2-thienyl)-2-(alpha-chloropropionamido)-1,3-propanediol:

To a mixture consisting of 1 g. of (dl)-B-1-(3-methyl-5-nitro-2-thienyl)-2-amino-1,3-propanediol (prepared as in Example 6), 50 ml. of ethyl acetate and 50 ml. of 0.5 N sodium hydroxide solution maintained at about 0° C. there is added 1.5 ml. of alpha-chloropropionyl chloride. The resulting mixture is agitated at a temperature of 0° C. for a period of from about 10 to 15 minutes.

The ethyl acetate layer is removed and the aqueous layer is extracted twice with ethyl acetate. The combined ethyl acetate extracts are collected and dried. The ethyl acetate is removed by distillation under reduced pressure. The residue is recrystallized from ethylene dichloride. The product thus formed has the formula,

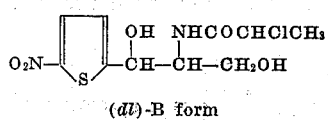

(dl)-B form

Example 11

Preparation of (dl)-B-1-(5-nitro-2-thienyl) - 2 - benzamido-1,3-propanediol:

To a mixture consisting of 2 g. of (dl)-B-1-(5-nitro-2-thienyl)-2-amino-1,3-propanediol (prepared as in Example 1), 10 g. of methylbenzoate and 40 ml. of methanol there is added a methanolic solution of sodium methoxide prepared by dissolving 0.16 g. of sodium in 15 ml. of methyl alcohol. The resulting mixture is heated at a temperature of 95° C. for a period of about one-half hour. It is then diluted with 2½ volumes of water and neutralized by the addition of dilute hydrochloric acid.

A gummy product is collected from the mixture. The product is purified by recrystallizations from ethyl acetate and ethanol. The purified product has the following formula:

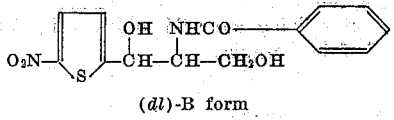

(dl)-B form

Example 12

Preparation of (dl)-B-1-(3-methyl-5-nitro-2-thienyl)-2-isobutyramido-1,3-propanediol:

A well-agitated mixture consisting of 1 g. of (dl)-B-1-(3 - methyl - 5 - nitro - 2 - thienyl) - 2 - amino - 1,3-propanediol (prepared as in Example 6) and 1 ml. of isobutyric anhydride is heated at a temperature of about 95° C. for a period of about 8 minutes. The reaction mixture is then cooled in an ice bath and the product, which separates, is collected and recrystallized from ethyl acetate. The formula of the product so obtained is

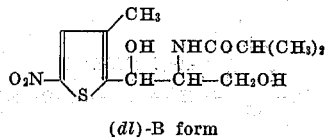

(dl)-B form

Example 13

Preparation of (dl)-B-1-(5-nitro-2-thienyl)-2-(2,4-dichlorophenoxyacetamido)-1,3-propanediol:

A mixture consisting of 1 g. of (dl)-B-1-(5-nitro-2-thienyl)-2-amino-1,3-propanediol (prepared as in Example 1) and 2 g. of methyl 2,4-dichlorophenoxyacetate is heated on the steam bath for a period of about two hours. The reaction mixture is then cooled and extracted several times with 30 ml. portions of petroleum ether. The residue which failed to dissolve is extracted four times with boiling ethyl acetate. The combined ethyl acetate extracts are dried with sodium sulfate and are then concentrated to dryness under reduced pressure. The residue contains a product having the following formula, and is recrystallized from absolute ethanol:

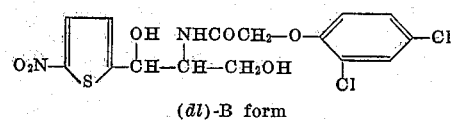

(dl)-B form

Example 14

Preparation of (dl)-B-1-(5-nitro-2-thienyl)-2-cyclohexanecarboxamido-1,3-propanediol:

1 g. of cyclohexanecarboxylyl chloride is added to a cooled mixture consisting of 1 g. of (dl)-B-1-(5-nitro-2-thienyl)-2-amino-1,3-propanediol and 25 ml. of ethyl acetate. The resulting mixture is stirred and maintained at a temperature of about 0° C. for a period of about 12 minutes. 25 ml. of ethyl acetate is then added. The resulting solution is washed with dilute hydrochloric acid, saturated with sodium bicarbonate solution, and finally with water.

The ethyl acetate solution is then dried and concentrated to dryness by distillation under reduced pressure. The residue is recrystallized from ethyl acetate and has the formula,

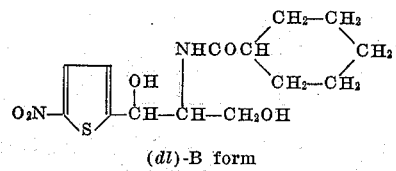

(dl)-B form

Example 15

Preparation of (dl)-B-1-(5-nitro-2-thienyl)-2-trifluoroacetamido-1,3-propanediol:

A mixture consisting of 2.5 g. of (dl)-B-1-(5-nitro-2-thienyl)-2-amino-1,3-propanediol (prepared as in Example 1), 5.5 ml. of ethyl trifluoroacetate, and 35 ml. of methanol is heated under reflux for a period of forty-five minutes. The resulting mixture is concentrated to dryness by distillation under reduced pressure. The residue is extracted twice with 50 ml. portions of petroleum ether. The undissolved residue is extracted with 70 ml. of boiling ethyl acetate.

The ethyl acetate extract is treated with decolorizing charcoal, filtered, cooled, then washed successively with 5% hydrochloric acid, saturated aqueous sodium bicarbonate, and water. The extract is finally dried with anhydrous magnesium sulfate. The ethyl acetate is then removed by distillation under reduced pressure. The crystalline residue (M. P. 124.5–126° C.) is chiefly the product which has the following formula:

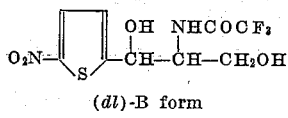

(dl)-B form

This product is purified by recrystallization from ethylene dichloride which raised its M. P. to 126.5–127° C.

Analysis calculated for $C_9H_9F_3N_2O_5S$: C, 34.40; H, 2.89; N, 8.92. Found: C, 34.00; H, 3.22; N, 8.76.

Example 16

The (*dl*)-A forms of the types of compounds shown in Examples 7–15, inclusive, can be prepared by the procedures analogous to the ones shown above, using, of course, the appropriate starting material in the A series.

I claim:

1. A process which comprises the steps of hydrolyzing a compound of the formula,

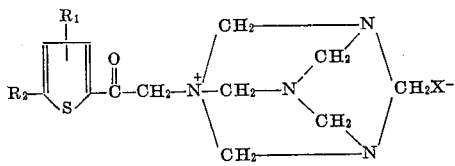

where $R_1$ is a member of the class consisting of hydrogen and lower alkyl radicals $R_2$ is am ember of the class consisting of hydrogen, halogen, nitro and lower alkyl radicals, and X is a member of the class consisting of chloro and bromo radicals, with a mineral acid, to obtain a compound of the formula,

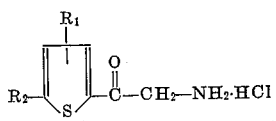

acylating the latter compound, recovering a compound of the formula,

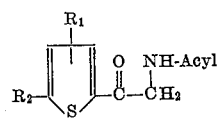

thus formed, reacting the latter compound with formaldehyde in the presence of dilute alkali to obtain a compound of the formula

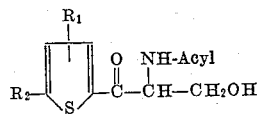

reacting the latter compound with sodium borohydride, recovering a compound of the formula,

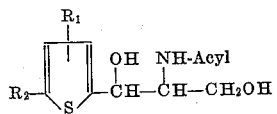

acylating the latter compound, recovering a triacyl compound of the formula,

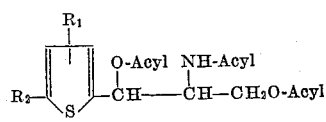

hydrolyzing the latter compound with acid in an aqueous medium, neutralizing the acid with alkali, recovering a compound of the formula,

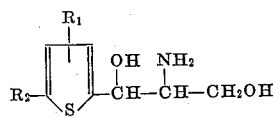

and mono acylating the latter compound to obtain a compound of formula,

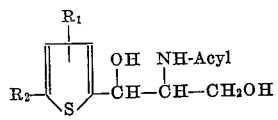

2. A process which comprises the steps of hydrolyzing a compound of the formula,

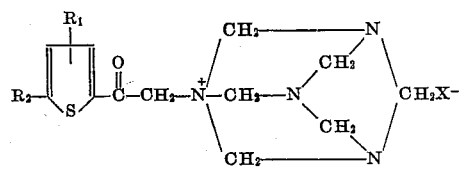

where $R_1$ is a member of the class consisting of hydrogen and lower alkyl radicals, $R_2$ is a member of the class consisting of hydrogen, halogen, nitro and lower alkyl radicals, and X is a member of the class consisting of chloro and bromo radicals, with a mineral acid, to obtain a compound of the formula,

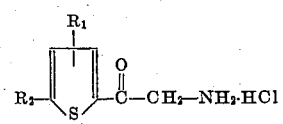

reacting the latter compound with a dichloroacetyl halide to obtain a compound of the formula

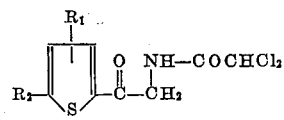

reacting the latter compound with formaldehyde in the presence of dilute alkali to obtain a compound of the formula,

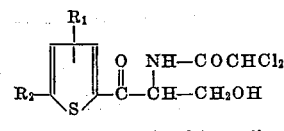

reacting the latter compound with sodium borohydride, recovering a compound of the formula,

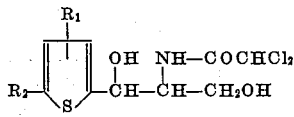

acylating the latter compound, recovering a triacyl compound of the formula,

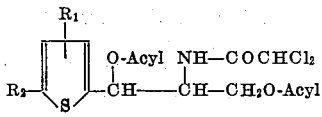

hydrolyzing the latter compound with acid in an aqueous medium, neutralizing the acid with alkali, recovering a compound of the formula,

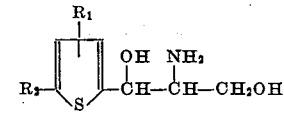

and mono acylating the latter compound to obtain a compound of formula,

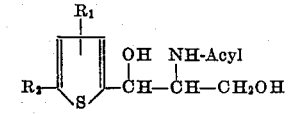

3. A process of claim 5 in which the triacyl compound of the formula,

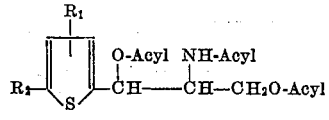

where $R_1$ and acyl have the same significance as in claim 1, and $R_2$ is hydrogen, is treated with fuming nitric acid and acetic anhydride to obtain a compound of the formula,

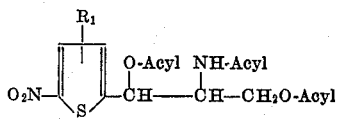

hydrolyzing the latter compound with dilute acid, neutralizing the acid with alkali, recovering a compound of formula,

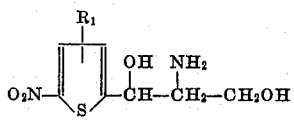

and mono acylating the latter compound to obtain a compound of formula,

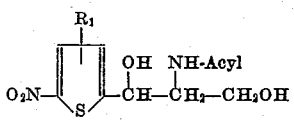

4. In a process, the steps comprising reacting a compound of formula,

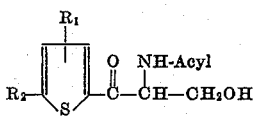

where $R_1$ is a member of the class of hydrogen and lower alkyl radicals, $R_2$ is a member of a class consisting of hydrogen, halogen, nitro and lower alkyl radicals, said acyl being a carboxylic acid acyl, with sodium borohydride to obtain a compound of formula,

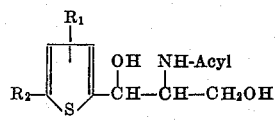

where $R_1$, $R_2$ and acyl have the same significance as above.

5. In a process for obtaining (dl)-B-1-(5-nitro-2-thienyl)-2-dichloroacetamido-1,3-propanediol, the steps comprising reacting N-(2-thenoylmethyl)hexamethylenetetraminium bromide with a mineral acid in the presence of an alcohol, recovering the [(2-thenoyl)methyl]amine salt thus formed, reacting the latter compound with acetic anhydride in a dilute alkaline solution to obtain N-(2-thenoylmethyl)acetamide, reacting the latter compound so obtained with formaldehyde in a dilute alkaline solution, recovering the (dl)-N-[2-hydroxy-1-(2-thenoyl)-ethyl]acetamide, reducing the latter compound with sodium borohydride, recovering the isomeric mixture of 1-(2-thienyl)-2-acetamido-1,3 - propanediols, acetylating the latter mixture with acetic anhydride to obtain triacetyl derivatives of A- and B-1-(2-thienyl)-2-amino-1,3-propanediols, hydrolyzing the latter mixture with water to obtain a mixture consisting of N,O-diacetyl derivatives of (dl)-B-1-(2-thienyl)-2 - amino - 1,3 - propanediol and (dl)-A-1-(2-thienyl)-2-amino-1,3-propanediol, recovering the higher melting N,O-diacetyl derivative of (dl)-B-1-(2-thienyl)-2-amino-1,3-propanediol, acetylating the latter compound with acetic anhydride to the (dl)-B-triacetyl-1-(2-thienyl)-2-amino-1,3-propanediol, reacting the latter racemic mixture with nitric acid and acetic anhydride, recovering the (dl)-B-1-(5-nitro-2-thienyl)-2-acetamido-1,3-propanediol diacetate thus formed, hydrolyzing the latter compound with mineral acid, neutralizing the acid with alkali, recovering the (dl)-B-1-(5-nitro-2-thienyl)-2-amino-1,3-propanediol thus obtained, and reacting the latter product with methyl dichloroacetate to obtain (dl)-B-1-(5-nitro-2-thienyl-2 - dichloroacetamido-1,3-propanediol.

References Cited in the file of this patent

UNITED STATES PATENTS

| | | |
|---|---|---|
| 2,103,266 | Lott | Dec. 28, 1937 |
| 2,483,871 | Bartz | Oct. 4, 1949 |
| 2,483,884 | Crooks et al. | Oct. 4, 1949 |
| 2,483,885 | Crooks et al. | Oct. 4, 1949 |
| 2,579,494 | Hermann | Dec. 25, 1951 |

OTHER REFERENCES

Keskin et al., J. Org. Chem., vol. 16, #9.
Rebstock et al., J. A. C. S., vol. 71, July 1949, pp. 2458–2468.
Long et al., J. A. C. S., vol. 71, July 1949, pp. 2469–2475.
Lands, Proc. Soc. Exp. Biol. Med., 57, 55–56 (1944).
Alles, J. Pharm. and Exp. Ther. 72, 265 (1941).
Blicke, J. A. C. S. 66, 1645 (1944).
Bernthsen et al., Org. Chem., p. 549, Van Nostrand, New York, 1937.
Whitmore, Org. Chem., p. 893, Van Nostrand, New York, 1937.
Richter, Org. Chem., pp. 649–650, Wiley, New York, 1938.
Powers, Advancing Fronts in Chem., vol. II, p. 33, Reinhold Pub. Co., New York (1946).
Caesar et al., Ind. Eng. Chem. 40, 922 (1948).
Viaud, Products Pharmaceutiques, 2, 53–64, February 1947.
Le Suer, "3-Substituted Thiophens," Doc. Thesis (Q. D. 1000 L644) Dept. of Chem. Ind. Univ., p. 2.
Karrer, "Organic Chemistry," 1938, pp. 92 and 93.